(12) United States Patent
Sandstrom

(10) Patent No.: US 8,891,157 B2
(45) Date of Patent: Nov. 18, 2014

(54) ACOUSTO-OPTIC DEFLECTORS OVER ONE OCTAVE

(75) Inventor: Torbjorn Sandstrom, Pixbo (SE)

(73) Assignee: Micronic AB, Taby (SE)

( * ) Notice: Subject to any disclaimer, the term of this patent is extended or adjusted under 35 U.S.C. 154(b) by 199 days.

(21) Appl. No.: 13/220,673

(22) Filed: Aug. 29, 2011

(65) Prior Publication Data

US 2012/0218623 A1 Aug. 30, 2012

Related U.S. Application Data

(60) Provisional application No. 61/378,251, filed on Aug. 30, 2010.

(51) Int. Cl.
*G02F 1/33* (2006.01)
*G02B 26/00* (2006.01)
*G01N 21/00* (2006.01)
*H01S 3/10* (2006.01)
*G02F 1/11* (2006.01)

(52) U.S. Cl.
CPC . *G02F 1/33* (2013.01); *G02F 1/113* (2013.01)
USPC ........... 359/305; 359/298; 356/237.1; 372/26

(58) Field of Classification Search
USPC .......... 359/285, 310, 305, 298, 299; 356/237.1–237.2; 372/26
See application file for complete search history.

(56) References Cited

U.S. PATENT DOCUMENTS

| 3,493,759 | A | * | 2/1970 | Adler | 359/311 |
| 3,759,603 | A | | 9/1973 | Eschler | |
| 3,851,951 | A | | 12/1974 | Eveleth | |
| 4,940,304 | A | | 7/1990 | Hatori | |
| 5,457,567 | A | * | 10/1995 | Shinohara | 359/305 |
| 6,700,600 | B1 | | 3/2004 | Sandstrom et al. | |

FOREIGN PATENT DOCUMENTS

WO WO 2008032061 A2 * 3/2008

OTHER PUBLICATIONS

Petrov, Vladimir V., "What about more than 2GHz acousto-optical interaction bandwidth", Proceedings of Spie, vol. 2969, Jan. 1, 1996, pp. 217-223, XP55010983, ISSN: 0277-786X, DOI: 10.1117/12.262602.
International Search Report, Application No. PCT/EP2011/064896, mailed Nov. 11 2011, 2 pages.

* cited by examiner

*Primary Examiner* — Dawayne A Pinkney
(74) *Attorney, Agent, or Firm* — Haynes Beffel & Wolfeld LLP; Ernest J. Beffel, Jr.

(57) ABSTRACT

The technology described applies an extended frequency range of over one octave to drive an acousto-optic deflector, thereby defying a design rule of thumb that limited bandwidth to just under one octave. A combination of extended frequency range and well-timed beam blanking reduces the proportion of a so-called chirp signal that is consumed by beam blanking. This increases the working, effective portion of the sweep signal.

12 Claims, 4 Drawing Sheets

ACOUSTO-OPTIC DEFLECTORS OVER ONE OCTAVE

RELATED APPLICATION

This application claims the benefit of U.S. Provisional Patent Application No. 61/378,251, entitled "Acousto-Optic Deflectors Over One Octave," filed 30 Aug. 2010. The priority application is incorporated by reference herein.

Prior work by this inventor on acousto-optic deflectors includes U.S. Pat. No. 6,700,600 issued Mar. 2, 2004, which is also incorporated by reference herein.

BACKGROUND OF THE INVENTION

For classification purposes, we suggest that the general technical field of this disclosure be considered an optical element that varies a characteristic direction of a traversing optical light beam in proportion to a time-varying acoustical signal applied to a diffractive crystal, a so-called acousto-optic deflector (AOD). The diffraction of light that passes through the AOD is a function of time as the deflection-causing signal varies. The deflection-causing signal changes bulk optical characteristics of the diffractive crystal, varying diffraction through an optically transmitting medium. An ultrasonic wave generated at the surface or within the confines of the light control element sets up conditions in the element which produce a change in the optical parameters (e.g., refractive index) directly controlling the light.

Micronic Mydata AB ("Micronic") builds capital equipment for mask making and direct writing to workpieces. The Prexision and LRS pattern generators make large area masks that are used, for instance, to create flat panel displays or televisions on large Generation 10 substrates in the latest pattern generator models. The Omega pattern generators make masks or reticles for chip making. Common to these pattern generators is use of scanned laser beams for forming latent images in resist on the surface of a workpiece, with scanning controlled by acousto-optic deflectors (AODs). This application describes an improved AOD that will have practical application beyond Micronic's pattern generators.

One AOD that Micronic has used is specified by the supplier to operate over a bandwidth of 100 MHz. In some applications, the driving frequencies applied to this AOD are centered around 200 MHz. In practice, it has been determined that this AOD can be used over a frequency range of around 130 MHz. Applying this bandwidth centered at 200 MHz, the lowest and highest frequencies in the operating range are 200−130/2=135 MHz and 200+130/2=265 MHz, respectively. Other AODs tested by Micronic have had a specified bandwidth of 150 MHz.

There is a general design rule of thumb that one must operate the AOD over less than one octave, i.e., the highest frequency must be lower than twice the lowest frequency. This rule of thumb avoids having the optics swept by the AOD collect higher diffraction orders (multiples of any frequency) of swept beams. To drive AODs, a frequency chirp of 5 MHz/µs has been used, generated by a direct digital synthesis (DDS) card. Consistent with the rule of thumb, this frequency chirp has a sweep time of about 24 µs. The so-called chirp produces a sawtooth pattern, which ramps up until it reaches the maximum frequency limit and then steps down to the minimum frequency limit. The chirp produces a repeating series of ramps and discontinuous steps down in frequency. In the following figures, only one cycle of the chirp is typically represented. Those of skill in the art will understand that the saw-tooth pattern continues indefinitely, through many cycles.

We disclose methods by which the old rule of thumb can be defied, resulting in an AOD with an extended frequency bandwidth, extended some 10-30 percent beyond one octave.

An opportunity arises to improve the sweep electronics of patterning and inspection systems. Better, faster, more efficient components and systems may result. The technology disclosed applies to both writing and reading with an optical beam.

SUMMARY OF THE INVENTION

The technology described applies an extended frequency range of over one octave to drive an acousto-optic deflector, thereby defying a design rule of thumb that limited bandwidth to just under one octave. A combination of extended frequency range and well-timed beam blanking reduces the proportion of a so-called chirp signal that is consumed by beam blanking. This increases the working, effective portion of the sweep signal. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

We disclose a device and method that defy the design rule of thumb that restricts AOD operation to one octave. The inventors have used an extended frequency chirp of at least 6.1 MHz/µs to drive an AOD, in defiance of the rule of thumb. This extended frequency chirp corresponds to an increased AOD driving bandwidth and to an increased sweep angle of rays passing through the AOD. Higher frequencies induced in the AOD produce stronger diffraction. In contrast to AOD driving bandwidth having been previously limited to less than one octave, systems with 1.3 octave bandwidth are described.

The problem that the design rule of thumb avoids is ghost images. The AOD diffraction crystal diffracts an incoming beam on the zeroth-order path along first and second order paths, and potentially along additional paths. The first and second order path are separated by one octave. A system that is designed to utilize more than one octave bandwidth could easily produce ghost images on the workpiece, as a result of diffraction along the second order path.

In the technology disclosed, a combination of countermeasures is taught that alleviates the problems that led to the one-octave design rule of thumb. The combination of aperture framing and blanking interval allows use of AOD driving bandwidth that exceeds one octave, contrary to the design rule of thumb.

Figure 1:
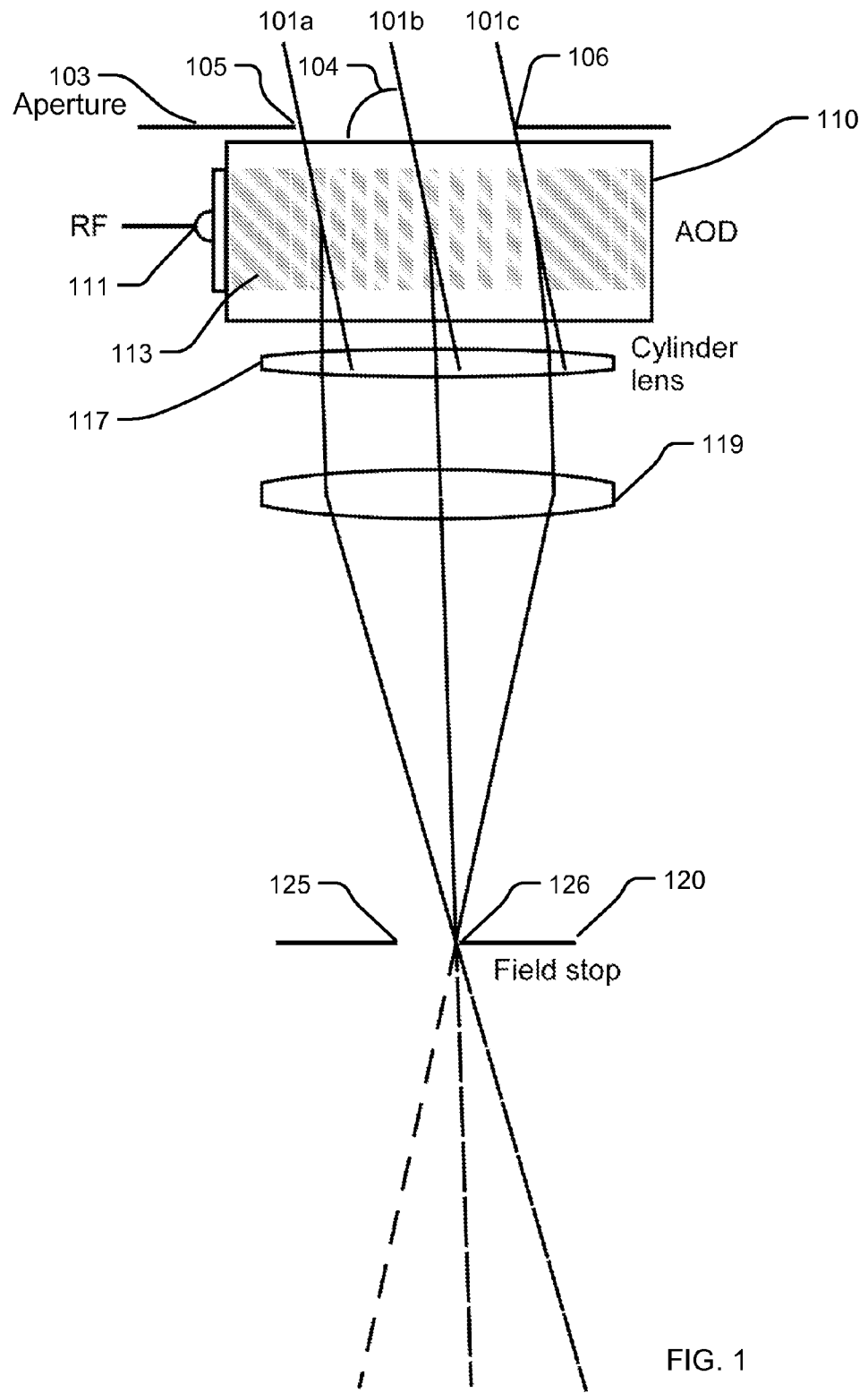
FIG. 1 illustrates use of a field stop with an AOD in a simplified optical system.

FIG. 1 illustrates use of a field stop with an AOD in a simplified optical system. Light beams 101a, 101b and 101c from an illumination source are projected through the optical path of a diffractive crystal 110, sometimes at an angle 104 known as a Bragg angle. This light passes through an aperture stop 103 that has first and second edges 105, 106. The AOD is driven by at least one RF driver 111 and sometimes by multiple RF drivers, which may be steered by their phase relationships to one another. The RF driver induces an acoustic wave 113 in the AOD. Unlike radio or light waves, which cover the distance from 105 to 106 almost instantaneously, the acoustic wave has a definite, non-negligible propagation time as it travels the width of the aperture through the AOD crystal. Due to this propagation time, the acoustic wave varies in frequency across the width of the AOD crystal. In addition, the intensity of the acoustic wave attenuates across this width, for which the system may be designed to compensate.

The diffraction properties of the crystal depend on the local frequency of the acoustic wave. In the figure, slightly different diffraction angles, responsive to different local acoustic frequencies within the crystal, are illustrated for the light rays 101a, 101b and 101c. This is depicted by an angle between the diffracted rays passing through the AOD and extensions of the undiffracted rays. Lens elements 117, 119 relay the diffracted rays to a field stop 120. The field stop keeps harmonics of the acoustic frequency from passing through the field stop. For instance, in FIG. 2, if a 200 MHz diffraction signal produces a minimal diffraction of ray 101c, causing it to fall just within edge 126 of the field stop 120, then a 400 MHz diffraction signal, which is a harmonic of the 200 MHz signal, will diffract the ray so that it is stopped by the opposite edge 125 of the stop. The gap between edges 125 and 126 is small enough that harmonics of the lowest frequency used should fall outside the field stop.

Figure 2:
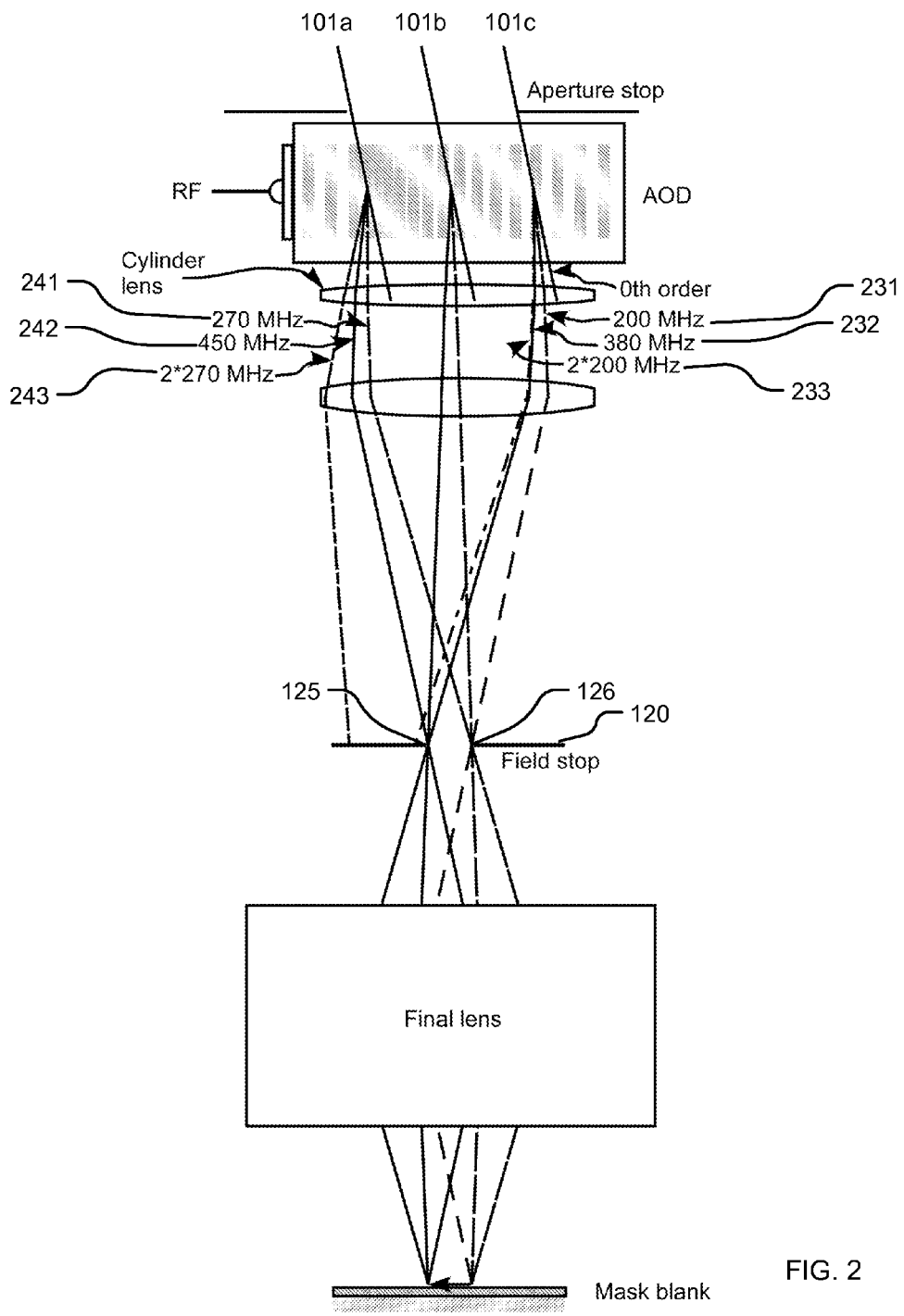
FIG. 2 illustrates a field stop sized to accommodate driving frequencies of 200 to 380 MHz at the right edge of the aperture and the aperture stop which limits the size of the beam in the crystal.

FIG. 2 illustrates a field stop 120 sized to accommodate driving frequencies of 200 to 380 MHz from the right aperture edge. The path of ray 101c is traced for driving frequencies of 200 MHz (231), 380 MHz (232) and 2*200 or 400 MHz (233). At the field stop, the 200 MHz signal (231) passes through the field stop at edge 126. The 380 MHz signal (232) passes through the field stop at the opposite edge 125. The 400 MHz signal (233) is stopped by the field stop, falling to the left of edge 125.

The path of ray 101a is traced for driving frequencies of 270, 450 and 2*270 or 540 MHz (241, 242, 243). As expected, when light ray 101a is diffracted by a 270 MHz signal (241), it passes through the field stop. Also as expected, when light ray 101a, at the left edge 105 of the aperture stop 103, is diffracted by a 540 MHz signal (243), it falls far outside the opening in field stop 120. However, when light ray 101a is diffracted by a 450 MHz driving frequency (242), it appears to pass through the field stop. In an operating range of 200-380 MHz, this would not actually happen, due to blanking of the beam.

For ray 101c, the field stop conforms to the rule of thumb that one can only use one octave of driving frequency. In contrast, for ray 101a, the field stop appears to pass frequencies that could exceed one octave, since 450 MHz is larger than 2*200 or 400 MHz. This does not actually happen, again due to blanking of the beam. As is seen in FIG. 2, the total range of frequencies has a range larger than an octave, but for each point (101a, 101b, 101c) in the aperture stop less than one octave is used. The limit of the frequency range occurs when the aperture edge 106 having the lowest frequencies approaches one octave, e.g. 200 to 380 MHz as shown in FIG. 2.

Figure 6:
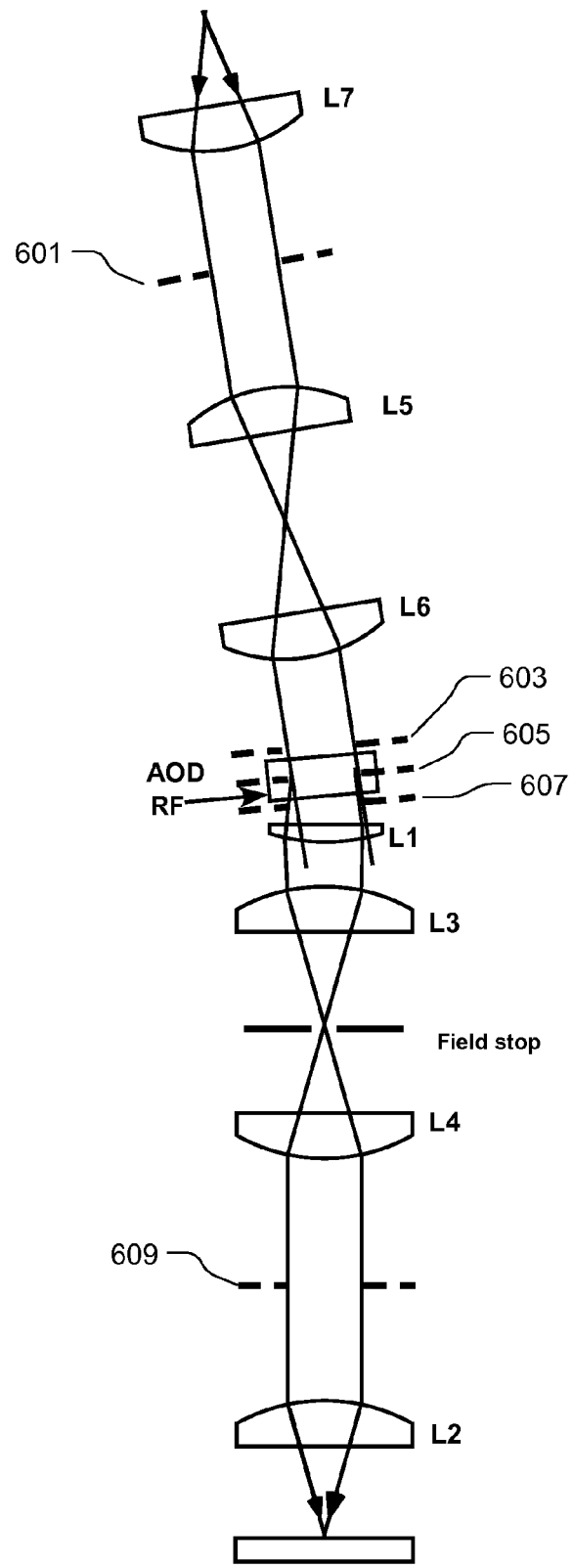
FIG. 6 shows where an aperture stop can be placed. In general, it can be placed where the illumination is collimated or nearly collimated.

FIG. 6 shows some of the positions where an aperture stop can be placed. In general, it can be placed where the illumination is collimated or nearly collimated. The aperture preferably is close to where the diffraction takes place. Ideally, the aperture might be at 605, embedded within the diffraction crystal. More practically, an aperture can be positioned just before 603 or after 607 the AOD. In a practical system there may be a telescope L5-L6 between the collimator L7 and the AOD and/or a telescope L3-L4 between the AOD and the final lens L2. L1 is the cylinder lens compensating for the apparent cylinder lens effect in the AOD. Equivalent aperture planes to 605 where the aperture stop can be placed can be found at 601 and/or 609. Note that the aperture stop may be located after the field stop. The field stop should be between the AOD and the workpiece and at or close to an image plane, e.g. either in the telescope L3-L4 or close to the workpiece.

Figure 3:
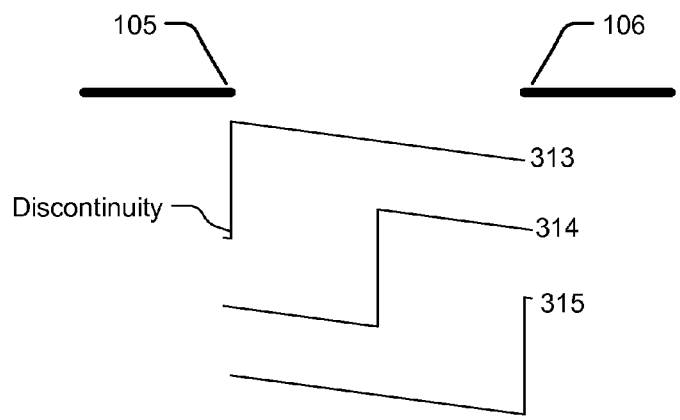
FIG. 3 illustrates how blanking time interacts with the width of the aperture stop.

FIG. 3 illustrates how blanking time interacts with the width 105 to 106 of the opening in aperture 103. In the general arrangement of FIG. 3, the blanking time is the time that the acoustic wave takes to propagate through the crystal 110 across the aperture stop opening, from edge 105 to edge 106. Alternatively stated, the fill time is the time it takes for the ultrasound to cross the aperture in the AOD, to "fill" it or "filling it." The beam is blanked to avoid having the crystal act as a deflector while the discontinuity in the chirp signal is traversing the opening. Wave 313 represents the chirp position in the crystal just before blanking. The highest frequency is propagating through the crystal from left to right. A discontinuity immediately trails the highest frequency, when the chirp signal drops from its highest to its lowest frequency. Wave 314 shows the discontinuity in the middle of the aperture. Wave 315 shows the discontinuity passing to the far edge 106 of the aperture. The waves 313-315 approximately represent the blanking of the beam and disuse of the crystal for beam diffraction as the discontinuity passes. The innovative chirp is beneficial in two ways: first it allows a wider frequency range to be used allowing a wider angle of scanning, and, second, it allows a smaller fraction of the total time to be blanked, or alternatively a higher chirp rate to be used making the scanning faster.

Figure 4:
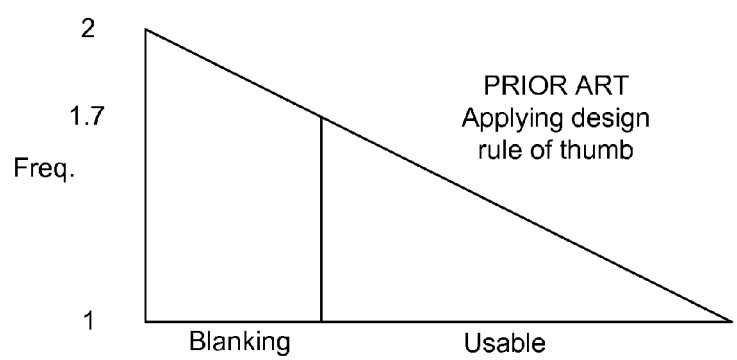
FIGS. 4-5 represent the reduced blanking time as a proportion of the chirp signal.
Figure 5:
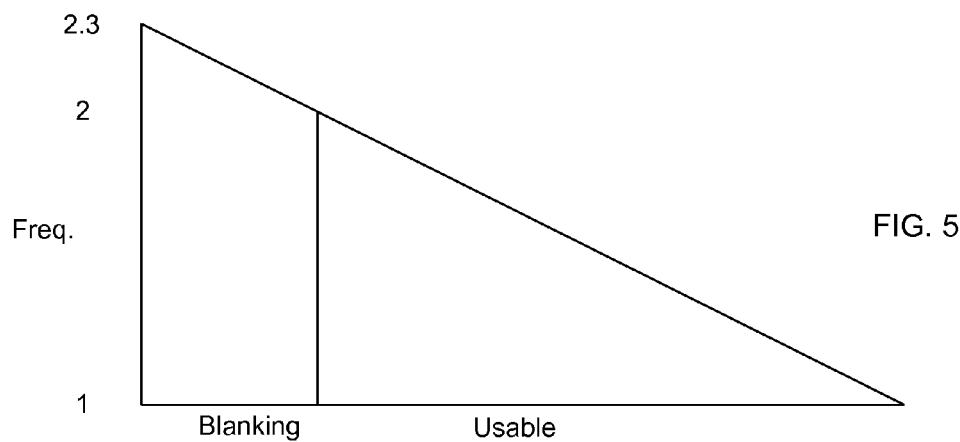

FIGS. 4-5 represent the reduced blanking time as a proportion of the chirp signal. FIG. 4 shows the prior art chirp as it propagates through the crystal from left to right. The x-axis represents the position of chirp within the AOD crystal (with the earliest generated frequency at the right side of the graph.) The y-axis represents a frequency varying from 1× to 2×, through one octave. In the figure, the low frequency traverses the crystal first, although the opposite arrangement could be adopted. The AOD is usable as the chirp transits the crystal, until the discontinuity or step between ramps (see FIG. 3, 313) reaches the near aperture opening 105, on the left. The blanking continues until the discontinuity has passed the far aperture opening 106 (see 315.) Using the prior art chirp, during some percentage of the chirp frequency range the beam was blanked, as the discontinuity passed the aperture opening.

FIG. 5 shows the innovative chirp, which defies the design rule of thumb by ranging over 1.3 octaves. In this graph, 0.3 units of frequency sweep are still blanked, but the chirp sweeps through 1.3 octaves. In comparison to the prior art, the proportion of a chirp that is lost to blanking is reduced from 0.3/1.0 to 0.3/1.3, or from 0.30 to 0.23.

The design improvement resulting from of this innovative chirp can be realized without being optimized. For instance, the driving signal for the AOD might rise beyond one octave for longer than necessary to allow a discontinuity to transmit an active portion of the crystal, with the blanking exaggerated to compensate. Or, the driving signal might rise above one octave for less time than needed for the discontinuity to traverse the aperture. Then, part of the potentially usable duty cycle would be devoted to blanking.

Most generally, we consider it useful to improve by at least five percent or preferably by about ten percent the proportion of the driving frequency range that is used and not blanked. It is useful to increase the chirp frequency range and resulting potential diffraction by ten percent or more. Consistent with the embodiments above, we find industrial utility in extended AOD driving frequency ranges of at least 1.10, 1.15, 1.20, 1.25 or 1.30 octaves or in ranges of frequencies between any two of these merit figures. In theory the frequency range can be even higher—2.00 or above.

In general, the throughput of the AOD increases with more bandwidth. The part of the chirp used for diffraction is limited to a maximum of one octave (or just slightly less) and the rest of the chirp frequency range is blanked, corresponds to fill time. In practical terms, the length of the scan can be constant but the sweep can run faster, while at the same time more and more of the chirp cycle is consumed by the blanking time. The portion of the chirp that corresponds to the scan is limited to a maximum of one octave (or just slightly less), and the rest of the chirp is blanked. Different parts of the chirp are blanked for different points in the aperture. The blanking time is equal (or slightly longer than) the time it takes for the ultrasound to cross the aperture. With a wider frequency range, the frequencies outside of one octave are chirped through during the blanking time. Therefore a wide frequency range equals a high scanning rate and a high pixel clock. The balance chosen wide bandwidth and high data rate depends on how a high pixel rate one wants to use. Above a frequency range of one octave (which is a high frequency two times the low frequency) the gain in throughput with an increasing range diminishes. One practical target for this trade-off is about a frequency range 1.3 octaves. In practice, it is expected that a frequency range of 2.0 octaves or more will produce an unfavorable tradeoff. A higher end of the frequency range, due to current practical limits on timing precision, may be 1.65 octaves. This may change as faster clocks and computing become available at practical costs.

Some Particular Embodiments

The technology disclosed may be practiced as a device, method, article of manufacture or as software.

One device is an acousto-optic deflector, including a diffractive crystal, at least one RF driver coupled to the diffractive crystal, and an optical diffraction path through the diffractive crystal that has diffractive properties responsive to the RF driver. Driver circuitry is coupled to the RF driver that sweeps an extended frequency range from a first frequency to a second frequency, wherein the first and second frequencies span a frequency range of more than one octave. The RF drive induces an acoustic wave through the diffractive crystal. The extended frequency range increases a working portion of the swept frequency, as distinct from a blanked portion of sweep. This gain can be expressed in a variety of ways.

In some implementations, the acousto-optic deflector further includes circuitry that generates a blanking interval reference, wherein the blanking interval reference causes a beam traversing the optical diffraction path to be blanked for a blanking time that restricts use of the extended frequency range of more than one octave so that a non-blanked operating frequency range of the acousto-optic deflector is one less than one octave.

In other implementations, the acousto-optic deflector further includes blanking circuitry, wherein the blanking circuitry causes a beam traversing the optical diffraction path to be blanked as a discontinuity between the high and low frequencies from the driver circuitry propagates across the optical diffraction path, whereby a non-blanked operating frequency of the acousto-optic deflector approaches a full one octave due to the driver circuitry sweeping the extended frequency range of more than one octave.

Another implementation includes an aperture stop positioned along the optical diffraction path prior to the diffractive crystal. In this implementation, the driver circuitry causes the swept frequency to continue to rise in excess of one octave above the first frequency for a time approximately equal to a time that it takes for a discontinuity in the driving frequency to traverse the aperture stop. By approximately equal, we mean within two percent. Alternatively, the swept frequency could continue to rise in excess of one octave above the low frequency for less than the time that it takes for a discontinuity in the driving frequency to transit the aperture stop, or for more than that time, with a performance penalty, as discussed above.

Any of these implementations may further include a field stop positioned between the diffractive crystal and a workpiece. A combination of blanking and an opening in the field stop does not allow diffracted radiation to pass through the field stop through more than one octave of the extended frequency range.

A range of ratios between the first and second frequencies can produce commercially useful results. Five ratios disclosed (+/−3 percent) include 1.10, 1.15, 1.20, 1.25 and 1.30 octaves. We further disclose using ratios between the first and second frequencies that are at least these merit figures. The rationale for these ratios is given above. Ranges of octave ratios may be bounded by any two of these ratios, such as 1.10-1.20 or 1.15-1.30.

We also can express the technology disclosed as a method of driving an acousto-optic deflector that includes a diffractive crystal and an aperture. The aperture is positioned between an illumination source and the diffractive crystal. This method includes applying a driving signal to the diffractive crystal. The driving signal sweeps a frequency range of more than one octave. The method further includes blanking at least one beam directed through an opening in the aperture onto the diffractive crystal as a discontinuity in the frequency range of the driving signal propagates through a portion of the diffractive crystal exposed to the beam by the opening in the aperture.

In some implementations, this method further includes driving the diffractive crystal using a frequency that continues to rise in excess of the one octave for a time approximately equal to a time that it takes for the discontinuity to transit the opening in the aperture. This relationship between the extended frequency range and blanking can be expressed in a variety of alternative ways, producing claims with slightly varying breadths.

The method optionally further includes driving the crystal using a frequency that continues to rise in excess of the one octave for less than a time that it takes for the discontinuity to transit the opening in the aperture.

The method may include relaying the beam directed through the aperture onto the crystal and through a field stop, wherein a combination of the blanking and an opening in the field stop limits diffracted radiation passing through the field stop and reaching the workpiece to radiation diffracted by less than one octave of the driving signal for any point in the aperture.

As described in the context of the device implementation, a range of ratios between the first and second frequencies can produce commercially useful results. Five ratios disclosed (+/−3 percent) include 1.10, 1.15, 1.20, 1.25 and 1.30 octaves. We further disclose using ratios between the first and second frequencies that are at least these merit figures. The rationale for these ratios is given above. Ranges of octave ratios may be bounded by any two of these ratios or merit figures, such as 1.10-1.20 or 1.15-1.30.

Corresponding articles of manufacture are non-transitory storage media including computer instructions. The computer instructions, when run on a processor or controller, cause the processor or controller and associated equipment to carry out any of the methods described. Alternatively, the computer instructions, when combined with appropriate hardware, produce any of the devices described.

Corresponding software may be directed to performing methods or as a component of a device. The software, when run on a processor or controller, causes the processor or controller and associated equipment to carry out any of the methods described. Alternatively, the software, when combined with appropriate hardware, produces any of the devices described.

I claim:

1. An acousto-optic deflector, including:
   a diffractive crystal;
   at least one RF driver coupled to the diffractive crystal;
   an optical diffraction path through the diffractive crystal that has refractive properties responsive to the RF driver;
   driver circuitry coupled to the RF driver that sweeps an extended frequency range from a first frequency to a second frequency, wherein the first and second frequencies span a frequency range of more than one octave; and
   a field stop positioned between the diffractive crystal and a workpiece, and at or close to an image plane, wherein a combination of blanking and an opening in the field stop does not allow diffracted radiation through more than one octave of the extended frequency range to pass through the field stop.

2. The acousto-optic deflector of claim 1, further including an aperture stop and circuitry that generates a blanking interval reference, wherein the blanking interval reference causes a beam traversing the optical diffraction path to be blanked for a blanking time that restricts use of the extended frequency range of more than one octave so that a non-blanked operating frequency range of the acousto-optic deflector at any point inside the aperture stop is one less than one octave.

3. The acousto-optic deflector of claim 1, further including an aperture stop and blanking circuitry, wherein the blanking circuitry causes a beam traversing the optical diffraction path to be blanked as a discontinuity between the high and low frequencies from the driver circuitry propagates across the optical diffraction path, whereby a non-blanked operating frequency of the acousto-optic deflector approaches a full one octave for at least one point inside the aperture stop due to the driver circuitry sweeping the extended frequency range of more than one octave.

4. The acousto-optic deflector of claim 1, further including an aperture stop, wherein the driver circuitry causes the swept frequency to continue to rise in excess of one octave above the first frequency for a time approximately equal to a time that it takes for a discontinuity in the driving frequency to traverse the aperture stop.

5. The acousto-optic deflector of claim 1, further including an aperture stop, wherein the driver circuitry causes the swept frequency to continue to rise in excess of one octave above the low frequency for less than a time that it takes for a discontinuity in the driving frequency to transit the aperture stop.

6. The acousto-optic deflector of claim 1, wherein a ratio of the first and second frequencies is at least 1.10 octaves.

7. The acousto-optic deflector of claim 1, wherein a ratio of the first and second frequencies is at least 1.20 octaves.

8. The acousto-optic deflector of claim 1, wherein a ratio of the first and second frequencies is at least 1.30 octaves.

9. A method of driving an acousto-optic deflector that includes a diffractive crystal and an aperture placed between an illumination source and the diffractive crystal, including:
   applying a driving signal to the diffractive crystal,
   wherein the driving signal sweeps a frequency range of more than one octave;
   blanking at least one beam directed through an opening in the aperture onto the diffractive crystal as a discontinuity in the frequency range of the driving signal propagates through a portion of the diffractive crystal exposed to the beam by the opening in the aperture; and
   relaying the beam directed through the aperture onto the crystal through a field stop positioned between the crystal and a workpiece, and at or close to an image place, wherein a combination of the blanking and an opening in the field stop causes diffracted radiation passing through the field stop to be diffracted by less than one octave of the driving signal.

10. The method of claim 9, further including driving the diffractive crystal using a frequency that continues to rise in excess of the one octave for a time approximately equal to a time that it takes for the discontinuity to transit the opening in the aperture.

11. The method of claim 9, further including driving the crystal using a frequency that continues to rise in excess of the one octave for less than a time that it takes for the discontinuity to transit the opening in the aperture.

12. The method of claim 9, further including using acoustical frequencies having a range of at least 1.20 octaves.

* * * * *